(12) United States Patent
Huffman

(10) Patent No.: US 8,602,393 B1
(45) Date of Patent: Dec. 10, 2013

(54) FLIP-IT AXLE LIFT, STOW AND DEPLOY MECHANISM

(76) Inventor: Larry E. Huffman, Theodosia, MO (US)

( * ) Notice: Subject to any disclaimer, the term of this patent is extended or adjusted under 35 U.S.C. 154(b) by 350 days.

(21) Appl. No.: 12/941,168

(22) Filed: Nov. 8, 2010

Related U.S. Application Data

(60) Provisional application No. 61/281,177, filed on Nov. 13, 2009.

(51) Int. Cl.
*B66D 1/00* (2006.01)

(52) U.S. Cl.
USPC .......................... 254/323; 212/179; 212/180

(58) Field of Classification Search
USPC .................................................. 254/323–328
See application file for complete search history.

(56) References Cited

U.S. PATENT DOCUMENTS

| | | | | |
|---|---|---|---|---|
| 2,556,175 A * | 6/1951 | Frost | ................................. | 14/2.4 |
| 2,933,213 A * | 4/1960 | Anderson et al. | ............. | 414/500 |
| 3,103,288 A * | 9/1963 | Pruss | ................................. | 298/8 T |
| 3,306,467 A * | 2/1967 | Weempe | ........................ | 414/541 |
| 3,404,793 A * | 10/1968 | Pinkert | ......................... | 414/812 |
| 3,843,093 A * | 10/1974 | Thompson et al. | ........... | 254/325 |
| 3,936,072 A | 2/1976 | Mandel | | |
| 4,068,827 A * | 1/1978 | Fanning et al. | ............... | 254/325 |
| 4,069,922 A * | 1/1978 | Hawkins | ....................... | 212/181 |
| 4,082,305 A * | 4/1978 | Allison et al. | ................ | 280/81.1 |
| 4,260,064 A * | 4/1981 | Ekstam | .......................... | 212/231 |
| 5,064,078 A * | 11/1991 | Van Staveren | ................ | 212/180 |
| 5,314,202 A * | 5/1994 | Wilkins, Jr. | .................... | 280/511 |
| 5,314,289 A * | 5/1994 | O'Leary | ......................... | 414/494 |
| 5,407,251 A * | 4/1995 | Ritchie et al. | ............ | 298/23 MD |
| 5,431,526 A * | 7/1995 | Peterson et al. | ............. | 414/543 |
| 5,445,487 A * | 8/1995 | Koscinski, Jr. | ............... | 414/543 |
| 5,662,451 A * | 9/1997 | Muzzi et al. | ................... | 414/540 |
| 5,725,112 A * | 3/1998 | Thorby | .......................... | 212/180 |
| 5,752,799 A * | 5/1998 | Carey et al. | ..................... | 414/543 |
| 5,975,831 A * | 11/1999 | Martin | ........................... | 414/543 |
| 5,993,137 A * | 11/1999 | Harr | .............................. | 414/550 |
| 6,202,868 B1 * | 3/2001 | Murray | .......................... | 212/294 |
| 6,315,311 B1 * | 11/2001 | Mathiowetz | ................. | 280/86.5 |
| 6,499,610 B2 * | 12/2002 | Spitsbergen | .................. | 212/179 |
| 7,536,965 B2 * | 5/2009 | Johnson | .......................... | 114/44 |
| 7,699,292 B2 * | 4/2010 | Barnett | .......................... | 254/334 |
| 2003/0189329 A1 * | 10/2003 | Smith | ........................... | 280/762 |
| 2007/0126196 A1 * | 6/2007 | Klahn | ........................... | 280/86.5 |
| 2009/0194000 A1 * | 8/2009 | Jacob | ........................... | 105/72.2 |

OTHER PUBLICATIONS

Rogers Brothers Corporation, 100 Orchard Street, Albion, PA 16401 USA; 1-800-441-9880; online catalog, item removable-axle-679X.jpg.

* cited by examiner

*Primary Examiner* — Emmanuel M Marcelo
*Assistant Examiner* — Michael Gallion
(74) *Attorney, Agent, or Firm* — Richard L. Marsh

(57) ABSTRACT

A tool for deploying and re-stowing a flip axle of a trailer comprises an upright post and an arm wherein the vertical post has one end fitted into a receiver disposed into a hole in a bed of the trailer. The arm may be removable from the top of the post. The top of the post has a pulley with a cable groove and the arm also has a pulley with a cable groove wherein the grooves receive a cable from an onboard winch of the trailer. A hook at a free end of the cable is attached to a rear channel of the flip axle and is used to deploy the flip axle behind the trailer or re-stow the flip axle on the bed of the trailer.

19 Claims, 4 Drawing Sheets

FLIP-IT AXLE LIFT, STOW AND DEPLOY MECHANISM

CROSS REFERENCE TO RELATED APPLICATIONS

This application is a non-provisional application of Applicant's provisional application Ser. No. 61/281,177 filed on 13 Nov. 2009 the specification of which is fully incorporated into this application by this reference thereto.

BACKGROUND OF THE INVENTION

1. Field of the Invention

This invention relates to a simple device for lifting, stowing and/or deploying a flip axle for a platform trailer. Specifically, the device comprises a post that is removably associated with a socket receiver disposed into the bed of the platform trailer which is used to lift and stow the flip axle wherein the post is also provided with a removable outrigger assembly for deploying the flip axle.

2. Prior Art Statement

It is common practice to lift a flip axle assembly, hereinafter tag axle, with the forks of a fork lift until the center of gravity of the tag axle passes a vertical line forward of the hinge between the tag axle and the platform trailer and then drop the tag axle onto the bed of the platform trailer. Deploying of the tag axle is commonly accomplished by hooking a chain or cable to the axle of the tag axle or bumper frame on the rear of the tag axle and pulling upward with the forks of a fork lift until the center of gravity of the tag axle passes a vertical line aft of the hinge point and then lowering or dropping the tag axle onto the traveling surface. These actions cause great strain on the hinge, unnecessary strain on the suspension and may damage the bed of the trailer. Therefore, there is a great need for a simple device to lift the tag axle by providing a post disposed in a socket receiver associated with the bed of the trailer, passing the winch cable of the flat bed winch system over the end of the post and lifting the tag axle to a position over the bed of the platform trailer until the center of gravity of the tag axle passes a vertical line forward of the hinge and thereafter reversing the winch to stow the tag axle on the surface of the platform trailer. There is also a need for the simple device to be provided with an outrigger assembly that extends over the end of the tag axle when resting upon the bed of the trailer that is used to lift the tag axle from the surface of the platform trailer, raise the center of gravity thereof to a point aft of the hinge and thereafter reversing the winch to deploy the tag axle onto a traveling surface.

It is also known to provide a tandem axle set that comprises a drive axle and a trailing axle. The trailing axle is supported on the truck frame but is adapted to be lifted from the ground by a pair of bell cranks carried by the support wherein the bell cranks engage a lower portion of the trailing axle. Fluid actuating cylinders move the bell cranks to lift the trailing axle. For instance, see the U.S. Pat. No. 3,936,072, issued on Feb. 3, 1976 to Darwin Mandel. The device only lifts the axle to raise the wheels above the traveling surface and requires a fluid power system to actuate the cylinders. The device would not be effective in raising the entire tag axle to a position on the bed of the trailer. Therefore, there is a need for a simple device comprising a post, a receiver socket and an outrigger assembly that can lift, stow and deploy a tag axle hingedly associated with a rear end of a platform trailer.

It is further known to provide an auxiliary axle assembly that comprises a support frame, a pair of spaced apart torque arms pivotally mounted on a common pivot axis to the support frame, a wheel and axle assembly mounted on the torque arms, a positioning means for moving the torque arms about the pivot axis and an alignment means for properly aligning the auxiliary axle with the primary axles. The device is sprung on the positioning means and is lifted by a chain attached to a fluid operated cylinder. For instance, see U.S. Pat. No. 4,082,305 issued on Apr. 4, 1978 to Allison, et al. As with Mandell above, this device also only lifts the axle to raise the wheels above the traveling surface and requires a fluid power system to actuate the cylinders. The device is expensive and would not be effective in raising the entire tag axle to a position on the bed of the trailer.

It is known to provide a lift and deploy for a tag axle assembly having a forward portion and a rearward portion. The forward portion is horizontally pivotally attached to the rear channel of the trailer while the rearward portion is vertically pivotable upon the forward portion. The assembly additionally comprises an actuator assembly cooperatively linking the trailer to the forward portion of the tag axle assembly, the actuator assembly capable of reversibly deploying the tag axle assembly from a stowed condition on the bed of the trailer. Two hydraulic cylinders are used to deploy the forward portion of the tag axle assembly while two ground engaging wheels are used to unfold the rearward portion from the forward portion. For instance, see the U.S. Pat. No. 6,315,311 B1 issued on Nov. 31, 2001 to Reinhold Mathiowetz. The additional structure for the forward position and the hydraulic cylinders make the entire assembly beyond the reach of most owner/operators. Therefore, there is a great need for a tag axle lift, stow and deploy assembly that is cost effective and can be handled manually by the operator of the vehicle.

Additionally, it is known to provide a boom lift apparatus mountable to different support structures to lift un attached objects onto a horizontal surface. The boom lift apparatus may be placed in a corner socket, a side mount socket, a vertical socket extending upwardly from a surface or in a socket disposed into a surface. For instance, see the U.S. Pat. No. 5,445,487 issued on 29 Aug. 1995 to Stanley Koscinski, Jr. The post, boom, winch and davit of the apparatus are not robust enough to lift heavy objects such as a tag axle assembly. Therefore, there still is a need for a robust tag axle lift, stow and deploy assembly that is cost effective and is operable from powered winch of the trailer.

Finally, it is known to provide a flip axle for a platform trailer that is hinged to the end of the platform trailer and may be stowed in an inverted position on the bed of the trailer. No means is provided to lift the tag axle to deploy same onto a traveling surface or means to lift and stow the tag axle as shown. For instance, see the non-patent document published by Rogers Brothers Corporation in an online catalog. Accordingly, the need is great to provide tool for deploying and re-stowing a flip axle of a trailer that comprises an upright post and a horizontal arm with a cable from an onboard winch of the trailer passed over pulleys on the arm and/or the post. A hook at a free end of the cable is attached to a rear channel of the flip axle and is used to deploy the flip axle behind the trailer or re-stow the flip axle on the bed of the trailer.

SUMMARY OF THE INVENTION

One object of this invention is to provide a device for lifting a tag axle of a platform trailer comprises an upright post, a socket tube and an outrigger assembly, the socket tube having an open end and a stop end, the stop end of the socket tube disposed into a bed of a platform trailer, the socket tube rigidly affixed to a frame of the platform trailer, the upright post provided with a butt end adapted to be removably disposed into the socket tube, the upright post provided with a pulley adjacent an upper end thereof, the outrigger assembly comprising a sleeve, an arm and a brace, the arm disposed at an angle from the sleeve, the brace extending from the sleeve to the arm, the brace rigidly affixed to the arm and the sleeve, the arm provided with a pulley at a free end of the arm, the sleeve of the outrigger assembly adapted to slide freely over the upper end of the post and be removable therefrom wherein the sleeve is provided with means to temporarily retain the outrigger assembly on the post.

A primary purpose of this invention is to provide a device for lifting and stowing a tag axle of a platform trailer comprises an upright post and a socket tube, said socket tube having an open end and a stop end, said stop end of said socket tube disposed into a bed of a platform trailer, said socket tube rigidly affixed to a frame of said platform trailer, said upright post provided with a butt end adapted to be removably disposed into said socket tube, said upright post provided with a pulley adjacent an upper end thereof, wherein said pulley at said upper end of said post receives a cable therein, said cable extending from a winch of said platform trailer to an attachment point on said tag axle.

Yet another object of this invention is to provide a device for lifting and deploying a tag axle of a platform trailer comprises an upright post, a socket tube and an outrigger assembly, said socket tube having an open end and a stop end, said stop end of said socket tube disposed into a bed of a platform trailer, said socket tube rigidly affixed to a frame of said platform trailer, said upright post provided with a butt end adapted to be removably disposed into said socket tube, said upright post provided with a pulley adjacent an upper end thereof, said outrigger assembly comprising a sleeve, an arm and a brace, said arm disposed at an angle from said sleeve, said brace extending from said sleeve to said arm, said brace rigidly affixed to said arm and said sleeve, said arm provided with a pulley at a free end of said arm, said sleeve of said outrigger assembly adapted to slide freely over said upper end of said post and be removable therefrom, said sleeve is provided with means to temporarily retain said outrigger assembly on said post wherein said pulley at said upper end of said post and said pulley at said free end of said arm receive a cable therein, said cable extending from a winch of said platform trailer to an attachment point on said tag axle.

An aim of this invention is to provide a tool for deploying and re-stowing a flip axle of a trailer comprises an upright post and a horizontal arm wherein said vertical post has one end fitted into a receiver disposed into a hole in a bed of said trailer, said horizontal arm fitted over a free end of said vertical post, said free end of said vertical post provided with a first pulley disposed therein, said first pulley having a groove circumferentially disposed in an exterior surface thereof, said horizontal arm having a free end thereof spaced from said vertical post, said free end provided with a second pulley disposed therein, said second pulley having a groove circumferentially disposed in an exterior surface thereof, said groove of said first pulley and said groove of said second pulley adapted to receive a cable therein wherein a hook attached at a free end of said cable is received in a "D" ring disposed through a rear channel of said flip axle and an opposite end of said cable is affixed to a winch provided onboard of said trailer.

DESCRIPTION OF THE PREFERRED EMBODIMENTS

Figure 1:
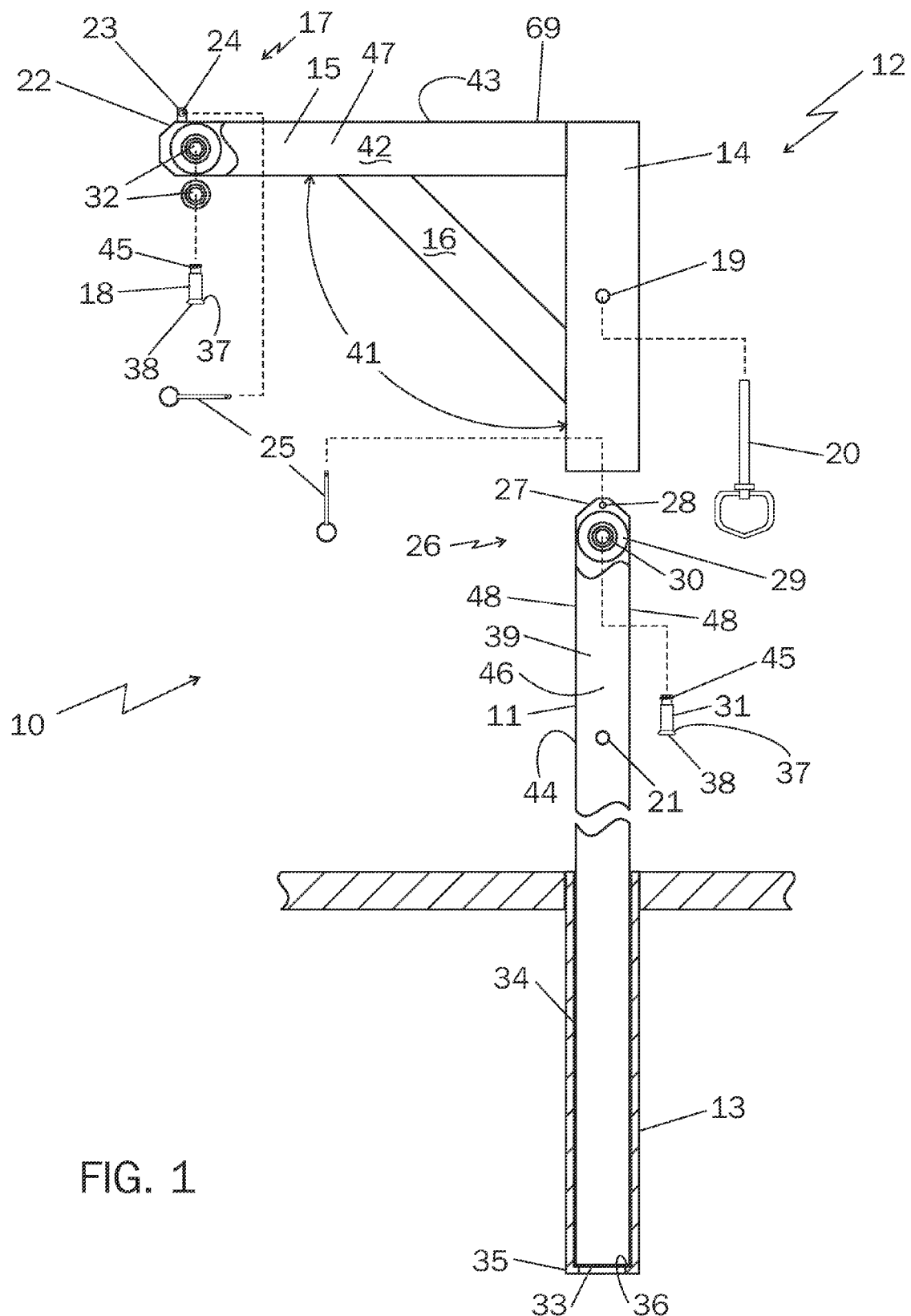
FIG. 1 is an exploded perspective view of the preferred embodiment of the lift, stow and deploy device of this invention with portions broken away to show internal details.

Referring now to the Figures, a device for flipping a tag axle of a platform trailer 50 is generally shown by the number 10, device 10 comprising an upright post 11, a socket tube 13 and an outrigger assembly 12 wherein socket tube 13 has an open end 34 and a stop end 35, stop end 35 socket tube 13 disposed into a bed 56 of platform trailer 50. Tag axle assembly 60 is generally used to provide additional wheels on the ground in support of load placed upon trailer bed 56 wherein the load on bed 56 is in excess of state or federal load per wheel requirements for the number of wheels 52 on trailer axle assemblies 51. Socket tube 13 is rigidly affixed to a frame 68 of platform trailer 50 by means known in the art such as welding or bolting. Upright post 11 is preferably a 2 inch by 3 inch rectangular box beam with ¼ inch thick walls and is about seven feet in length. Upright post 11 is provided with a butt end 33 adapted to be removably disposed into socket tube 13, butt end 33 of upright post 11 adapted to rest against stop end 35 of socket tube 13. Socket tube 13 is preferably a 3½ inch by 2½ inch rectangular steel box beam having ¼ inch thick walls about eighteen inches in length from open end 34 to stop 36 affixed within stop end 35 with open end 34 of socket tube 13 disposed substantially level with a top surface of bed 56 though it is fully within the scope of this invention to make socket tube 13 of any length that will support upright post 11. It is also fully understood that socket tube 13 and post 11 could be a shape selected from a group of shapes consisting of rectangular, circular, triangular, oval or combinations thereof without departing from the scope of this invention. Upright post 11 is provided with a pulley assembly 29 adjacent an upper end 26 of upright post 11, pulley assembly 29 consisting of a 3 inch diameter pulley fitted with bearings in each face and supported in post 11 by a pulley pin 31. Pulley pin 31 is a hardened steel shoulder bolt with a tapered head 37 wherein a flat top surface 38 of tapered head 37 is adapted to be flush with an outside surface 39 of front wall 46 of upright post 11. Pulley assembly 29 is retained in post 11 by pulley pin 31, threaded portion 45 of pulley pin 31 threaded into a threaded hole in rear wall 44 of post 11, threaded portion 45 substantially equal in length to a thickness of rear wall 44 such that threaded portion 45 terminates in rear wall 44 to accommodate sleeve 14 of outrigger assembly 12 thereover. A depression may be provided in surface 48 of post 11 adjacent top end 26 to allow for cable 57 to be operated over pulley assembly 29 without rubbing on outside surface 48 of post 11.

Outrigger assembly 12 comprises a sleeve 14, an arm 15 and a brace 16, arm 15 disposed at an angle 41 with respect to sleeve 14, arm 15 supported at angle 41 by brace 16 wherein brace 16 extends from sleeve 14 to arm 15 and is firmly affixed to both sleeve 14 and arm 15. Since flat top surface 38 of tapered head 37 of pulley pin 31 is flush with outside surface 39 of front wall 46 of upright post 11 and a sleeve 14 of outrigger assembly 12 is preferably a 2½×3½ inch rectangular box beam, sleeve 14 of outrigger assembly 12 will readily slide over upright post 11. Arm 15 is provided with a pulley assembly 17 at a free end 22 of arm 15, sleeve 14 of outrigger assembly 12 adapted to slide freely over upper end 26 of post 11 and be removable therefrom wherein sleeve 14 is provided with means 20 to temporarily retain outrigger assembly 12 on post 11. Means 20 may be any suitable device to couple units together however, is preferably a common ½ inch diameter hitch pin used with agricultural equipment. Pulley assembly 17 is disposed into free end 22 of arm 15, pulley assembly 17 identical to pulley assembly 29 and also consisting of a 3 inch diameter pulley fitted with bearings in each face but a pulley pin 18 is used to secure pulley assembly 17 to arm 15. Pulley pin 18 is also a hardened steel shoulder bolt identical to and interchangeable with pulley pin 31, pulley pin 18 inserted through bearing 32 then through a pulley pin hole (not shown) in front wall 47 of arm 15, through a second bearing 32 and threaded into a threaded hole (not shown) in back wall 43. Pulley pin 18 is also provided with a tapered head 37 wherein a flat top surface 38 of tapered head 37 is adapted to be flush with a front surface 42 of a front wall 47 of arm 15 and threaded portion 45 of pulley pin 18 of a length substantially equal to a thickness of back wall 43 of arm 15. Though described as substantially rectangular in cross section, it is understood here that sleeve 14, arm 15 and brace 16 could be any shape selected from a group of shapes consisting of rectangular, circular, triangular, oval or combinations thereof without departing from the scope of this invention wherein sleeve 14 would be of a shape cooperative with post 11. Though angle 41 is shown in FIG. 1 as substantially ninety degrees, it should be fully understood that angle 41 could be any angle from one degree up to 179 degrees but preferably is between about 45 degrees and 135 degrees and most preferably about 90 degrees.

Installation of flip-it device 10 is accomplished by first locating socket tube 13 at a position forward of a tag axle pivot 64 a distance 59 greater than a length of tag axle assembly 60. Distance 59 is measured from tag axle pivot 64 disposed at end 54 of trailer 50 to a rear facing wall 48 of post 11. One standard length of tag axle assembly 60 is 52⅞ inches and thus distance 59 would be at least 52⅞ inches plus a clearance between post 11 and end rail 61 of tag axle assembly 60 and therefore, distance 59 is preferably 55¾ inches. A socket hole 58 is cut into bed 56 at distance 59 and substantially centrally located between side rails 53, socket hole 58 at least equal to outside dimensions of socket tube 13. Since socket tube 13 is preferably a 3½ inch by 2½ inch rectangular box beam 18 inches in length, stop end 35 of socket tube 13 is inserted into socket hole 58 with open end 34 aligned with bed 56 of trailer 50 and welded to the frame 68 of trailer 50. Socket tube 13 thus remains fixed to trailer 50 though post 11 is removable therefrom and, as will be fully set forth below, outrigger assembly 12 is adapted to be removed from post 11. Though socket tube 13 has been described as located at 55¾ inches from tag axle pivot 64 for tax axle assembly 60 of 52⅞ inches in length, it should be fully understood that location of socket tube 13 may be located just forward of a stowed length of tag axle assembly 60 as described above. As post 11 and outrigger assembly 12 are adapted to be removable, installation of post 11 is described hereinafter relative to lifting, stowing and deploying tag axle assembly 60 while outrigger assembly 12 is described hereinafter as related to a lifting and deploying operation of tag axle assembly 60. Though the preferred length of tag axle assembly 60 and distance 59 have been described for a tag axle assembly 60 of 52⅞ inches in length, it should be fully understood that distance 59 will be greater for a tag axle assembly 60 of greater length and may be less for a shorter tag axle assembly 60.

A length of post 11 has been previously described as preferably about seven feet in length for a 52⅞ inch long tag axle assembly 60, however it should be understood that post 11 may be made a length commensurate with the length of tag axle assembly 60. For post 11 of the preferred embodiment, butt end 33 of post 11 is disposed eighteen inches into socket tube 13 and thus post 11 protrudes above bed 56 of trailer 50 about 66 inches. Since pulley assembly 29 is substantially at top end 26 of post 11, pulley assembly 29 is journaled on pulley pin 31 about 2 inches from top end 26 wherein side walls 48 of post 11 are relieved about 2 inches to expose pulley assembly 29 such that cable 57 will freely fit within a groove (not shown) in pulley assembly 29. End 26 may further be provided with extension 27 on front wall 46 and rear wall 44 wherein extension 27 is provided with a ball lock pin hole 28 for receiving a ball lock pin 25 therein. Ball lock pin 25 is provided to retain cable 57 on pulley assembly 29 while reaving cable 57 about pulley assembly 29 and/or pulley assembly 17 of arm 15. Ball lock pin hole 28 is about 2¼ inches beyond pulley pin hole 30 and, as ball lock pin 25 is disposed therein, ball lock pin 25 thus assists in keeping cable 57 in the groove in pulley assembly 29. Post 11 is provided with a hitch pin hole 19 at about 72 inches from butt end 33, hitch pin hole 19 adapted to receive hitch pin 20 therein when mounting outrigger assembly 12 upon end 26 of post 11.

Free end 22 of arm 15 may be provided with ears 23 extending upwardly from a top wall 69 of arm 15, ears 23 provided with ball locking pin holes 24 disposed therethrough and adapted to receive another ball lock pin 25 therethrough. Ball lock pin 25 for ears 23 is identical to, and interchangeable with ball lock pin 25 of extension 27 of post 11, ball lock pin 25 disposed in ears 23 serves to retain cable 57 on pulley assembly 17 while reaving cable 57 over pulley assembly 17 during lifting and deploying tag axle assembly 60 from a stowed position on bed 56. Ball lock pin 25 is preferably a simple ¼ inch diameter steel pin used in many applications for non-load bearing retention.

Figure 3:
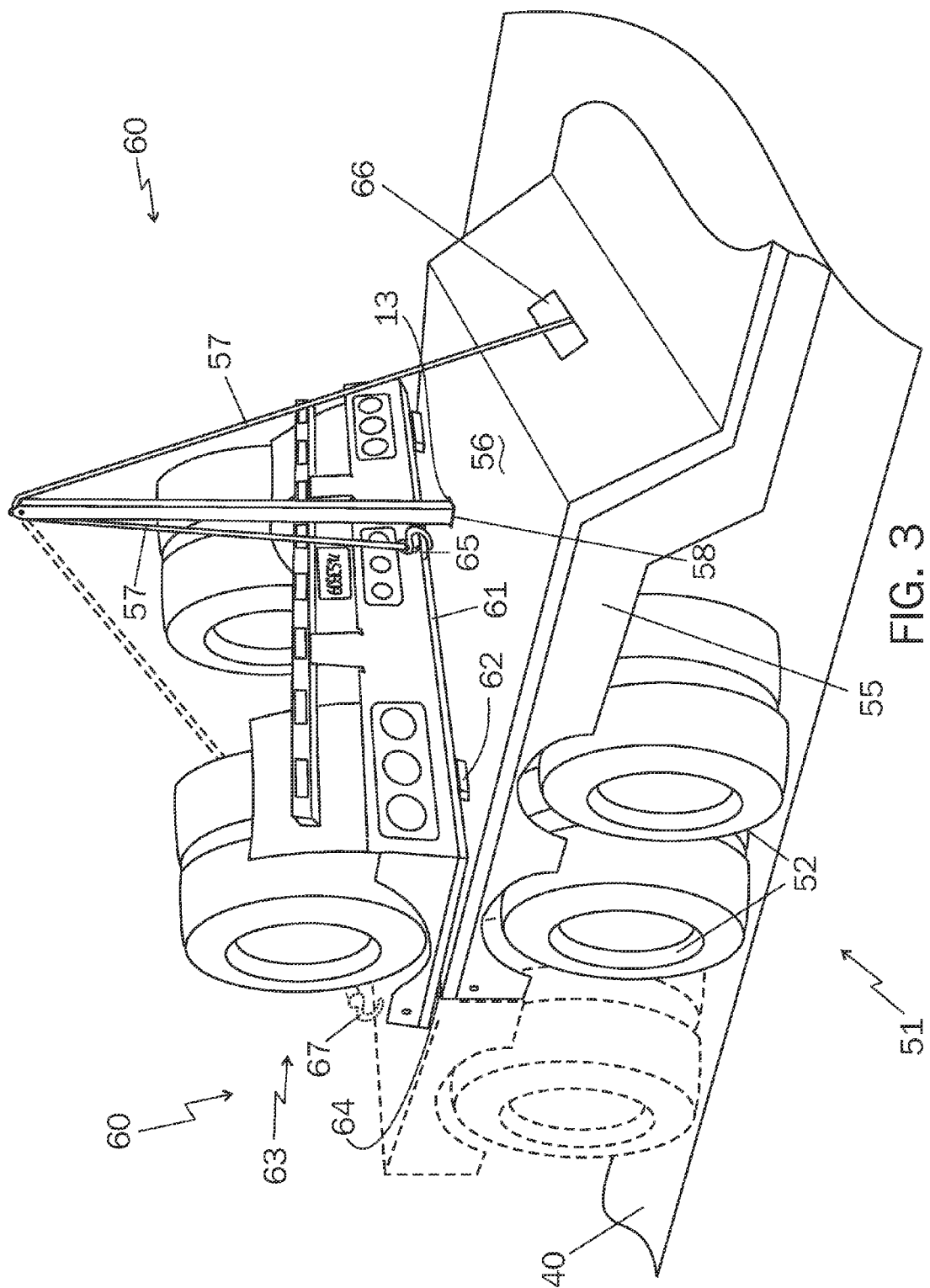
FIG. 3 is a perspective view of the preferred embodiment of the device of FIG. 1 shown stowing the tag axle onto the bed of the trailer from the deployed position of the tag axle shown in dashed lines.

Referring now specifically to FIGS. 1 and 3, tag axle assembly 60 is shown behind trailer 50 in a deployed position in dashed lines. To lift and stow tag axle assembly 60 onto bed 56 of trailer 50, post 11 is removed from a stored position and butt end 33 aligned with and inserted into open end 34 of socket tube 13 until butt end 33 rests upon stop end 35. Winch cable 57 is extended through winch hole 66 in bed 56 from the on-board winch of trailer 50 and is disposed over pulley assembly 29 in top end 26 of post 11. Winch cable 57 is then further extended to rear channel 61 of tag axle assembly 60 and a hook 67 at a terminal free end of cable 57 is inserted into a "D" ring 65 on rear channel 61. The on-board winch is then energized to retrieve cable 57, and as cable 57 is rove over pulley assembly 29 at end 26 of post 11 at a distance elevated above bed 56, wheels 63 of tag axle assembly 60 are raised clear of traveling surface 40. The on-board winch is continued in operation until tag axle assembly 60 is raised to a position above tag axle pivot 64 until a center of gravity of tag axle assembly 60 passes forward of a vertical line passing through tag axle pivot 64. Since the center of gravity of tag axle assembly 60 is now forward of the vertical line through tag axle pivot 64, tag axle assembly 60 tilts toward post 11. The winch is then reversed and tag axle assembly 60 is lowered onto bed 56 of trailer 50. Once tag axle assembly 60 is resting on bed 56 of trailer 50 in its stowed position, hook 67 of cable 57 is removed from "D" ring 65, cable 57 removed from pulley assembly 29 and cable 57 retracted. Post 11 is then stowed preferably on trailer 50 and may be stowed on the braces for a dolly assembly of trailer 50 or in an undercarriage rack behind side skirt 55 of trailer 50 along with 4×4 stakes generally used in stake pockets disposed through side rail 53. "D" ring 65 may be permanently affixed to rear channel 61, another part of end 54 of tag axle 60 but preferably is rotatably affixed to rear channel 61 on a pivot such that "D" ring 65 is lifted upwardly when used to stow or deploy tag axle 60 and rotated downwardly under rear channel 61 when not in use.

Figure 2:
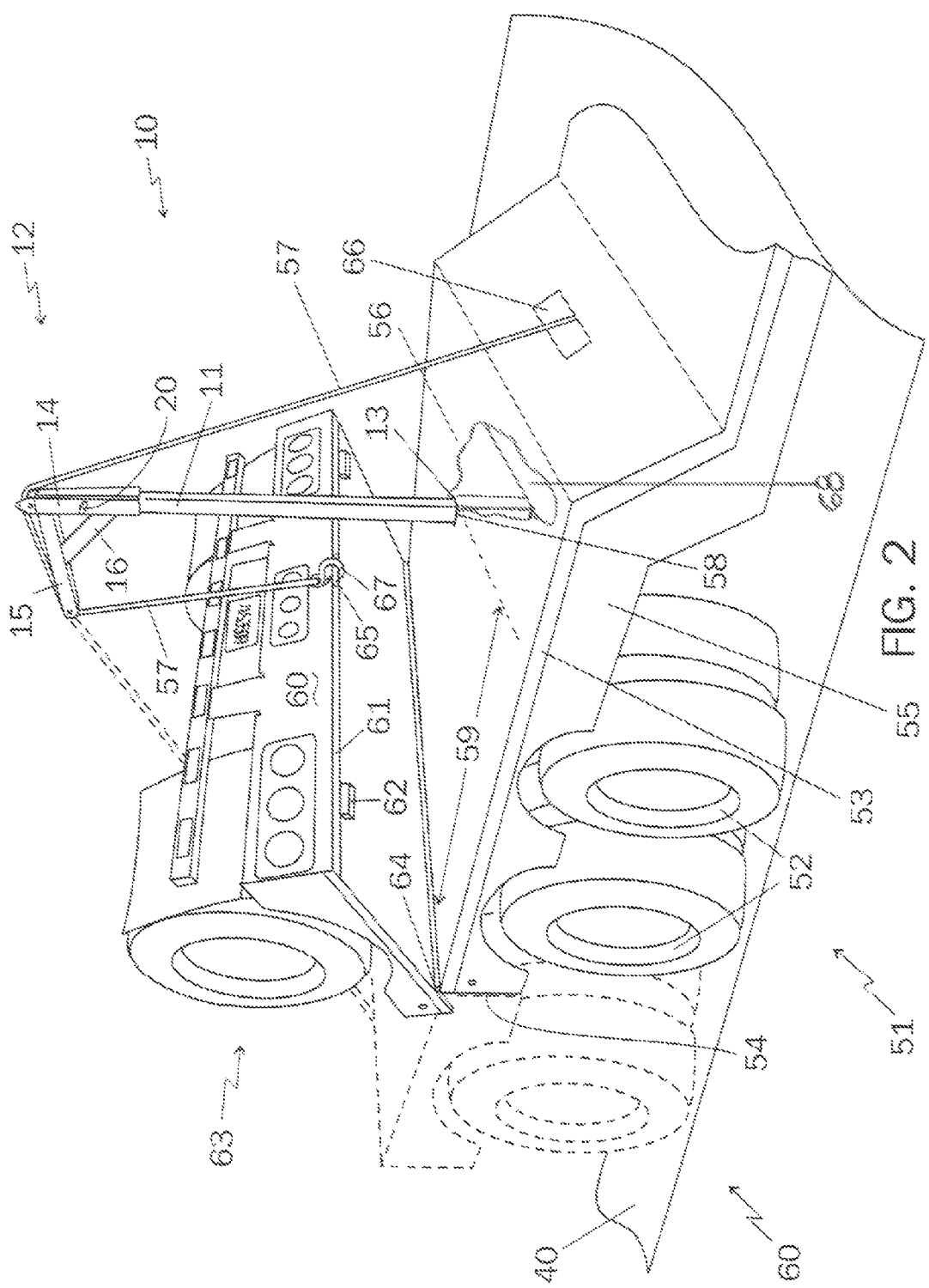
FIG. 2 is a perspective view of the preferred embodiment of the device of FIG. 1 with the outrigger disposed on the post, the device shown lifting and deploying the tag axle wherein the deployed tag axle is shown in dashed lines.

To deploy tag axle assembly 60 from an inverted stowed position with bumpers 62 resting on bed 56 of trailer 50 as best shown in FIG. 2, post 11 is first inserted into socket tube 13 such that post 11 stands erect from bed 56. Since flat top surface 38 of pulley pin 31 is flush with outside face 39 of front wall 46 of post 11 and threaded portion 45 is flush with rear wall 44 of post 11, sleeve 14 of outrigger assembly 12 shown in FIG. 1 slides readily over end 26 of post 11. Sleeve 14 is removably secured to post 11 by hitch pin 20 passed through hitch pin hole 19 in sleeve 14 and mating hitch pin hole 21 in post 11. Hitch pin 20 is preferably one of a plurality of different sized common agricultural pins used to removably secure agricultural instruments to a tractor or used for other agricultural purposes and most preferably is a one-half inch diameter, four inch long hitch pin with a locking bail associated with a free end thereof. As in a stowing operation described above, winch cable 57 is extended from the on-board winch of trailer 50 and is disposed over pulley assembly 29 in top end 26 of post 11 and also over pulley assembly 17 at free end 22 of arm 15 of outrigger assembly 12. Winch cable 57 is then further extended downwardly toward bed 56 near open end 34 of stock tube 13 and hook 67 at a terminal free end of cable 57 is inserted into "D" ring 65 on rear channel 61 of tag axle assembly 60. The on-board winch is then energized to retrieve cable 57, and as cable 57 is rove over pulley assembly 29 at end 26 of post 11 and pulley assembly 17 at free end 22 of outrigger assembly 12, tag axle assembly 60 is raised clear of bed 56. The on-board winch is continued in operation until tag axle assembly 60 is raised to a position above tag axle pivot 64 until a center of gravity of tag axle assembly 60 passes rearward of a vertical line passing through tag axle pivot 64. Since the center of gravity of tag axle assembly 60 is now rearward of the vertical line through tag axle pivot 64, tag axle assembly 60 tilts away from post 11 and tilts aft of trailer 50. The winch is then reversed and tag axle assembly 60 is lowered until wheels 63 engage traveling surface 40. Once wheels 63 of tag axle assembly 60 are resting on traveling surface 40, hook 67 of cable 57 is removed from "D" ring 65, cable 57 removed from pulley assemblies 17 and 29 and cable 57 retracted. Outrigger assembly 12 is removed from post 11 and post 11 is removed from socket tube 13. Outrigger assembly 12 and post 11 are then stowed on trailer 50 for later use. Tag axle assembly 60 is then pinned to trailer 50 at a point below tag axle pivot 64 to provide the necessary number of axles on traveling surface 40 to comply with federal or state weight limits.

Figure 4:
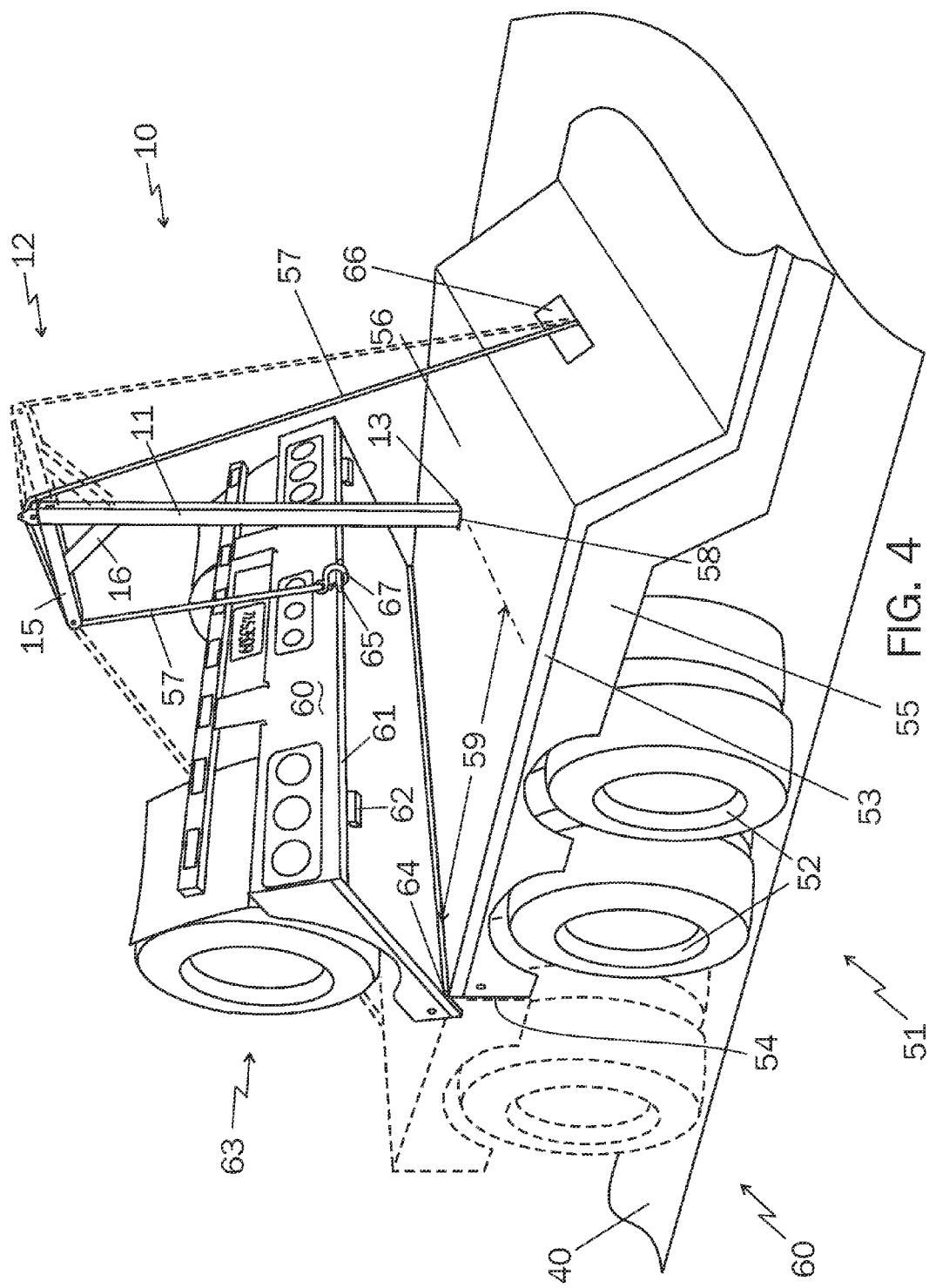
FIG. 4 is a perspective view of an alternate embodiment of the device of FIG. 1 with a one piece outrigger and post, the device shown lifting and deploying the tag axle in solid lines and preparing for lifting and stowing the tag axle shown in dashed lines.

Post 11 and outrigger assembly 12 of flip-it device 10 fully comply with the Federal Government Occupational Safety and Health Administration lift requirements as post 11 with pulley assembly 29 disposed therein is approximately 50 pounds and outrigger assembly 12 fully assembled with pulley assembly 17 is approximately 30 pounds when manufactured according to the preferred embodiment using box beams. However, it is fully within the scope of this invention to marry together post 11 and outrigger assembly 12 such that a flip-it device 10 is one piece as shown in FIG. 4. In this alternative embodiment, post 11 and outrigger assembly 12 may be made of lighter materials, slightly smaller in overall dimensions, of different shapes such as I-beam, angle, U-channel or rectangular, circular, triangular, oval box beams as described above or a combination of these recited alternates such that one piece flip-it device 10 will still comply with OSHA regulations and be readily usable by an operator of platform trailer 50. Use of the one piece flip-it device 10 is simplified as the stowing operation merely requires that arm 15 is oriented toward the onboard winch of trailer 50 while in the deploying operation, arm 15 is oriented toward tag axle assembly 60. All other aspects of either lifting and stowing operation or lifting and deploying operation remain the same as recited above. It is also within the scope of this invention to provide a second pulley assembly adjacent pulley assembly 29 on post 11 for stowing tag axle assembly 60 onto trailer bed 56 wherein flip-it device 10 is oriented with arm 15 aft of post 11 for deploying tag axle assembly 60 and the second pulley assembly is used for stowing tag axle assembly.

While the present invention has been described with reference to the above described preferred embodiments and alternate embodiments, it should be noted that various other embodiments and modifications may be made without departing from the spirit of the invention. Therefore, the embodiments described herein and the drawings appended hereto are merely illustrative of the features of the invention and should not be construed to be the only variants thereof nor limited thereto.

I claim:

1. A device for lifting a tag axle of a platform trailer comprises an upright post, a socket tube and an outrigger assembly, said socket tube having an open end and a stop end, said stop end of said socket tube disposed into a bed of said platform trailer, said socket tube rigidly affixed to a frame of said platform trailer, said upright post provided with a butt end adapted to be removably disposed into said socket tube, said upright post provided with a pulley adjacent an upper end thereof, said outrigger assembly comprising a sleeve, an arm and a brace, said arm disposed at an angle from said sleeve, said brace extending from said sleeve to said arm, said brace rigidly affixed to said arm and said sleeve, said arm provided with a pulley at a free end of said arm, said sleeve of said outrigger assembly adapted to slide freely over said upper end of said post and be removable therefrom wherein said sleeve is provided with means to temporarily retain said outrigger assembly on said post, said device lifting said tag axle free from a traveling surface engaging position, inverting said tag axle about a horizontal pivot disposed at an end of said platform trailer and lowering said tag axle into an inverted stowed position onto said bed of said platform trailer, said device also provided for lifting and deploying said tag axle from said inverted stowed position on said bed of said platform trailer and lowering said tag axle to said traveling surface engaging position to provide additional wheels on said traveling surface in support of additional load placed upon said bed.

2. A device as in claim 1 wherein said socket tube is selected from a group of shapes consisting of rectangular, circular, triangular, oval or combinations thereof.

3. A device as in claim 2 wherein said upright post is selected from a group of shapes consisting of rectangular, circular, triangular, oval or combinations thereof.

4. A device as in claim 3 wherein said arm, said sleeve and said brace of said outrigger assembly are selected from a group of shapes consisting of rectangular, circular, triangular, oval or combinations thereof.

5. A device as in claim 1 wherein said angle is between forty-five and one hundred thirty five degrees.

6. A device as in claim 5 wherein said angle is ninety degrees.

7. A device as in claim 1 wherein stop end of said socket tube is closed.

8. A device as in claim 1 wherein stop end of said socket tube is provided with an internal collar.

9. A device for lifting and stowing a tag axle of a platform trailer comprises an upright post and a socket tube, said socket tube having an open end and a stop end, said stop end of said socket tube disposed into a bed of said platform trailer, said socket tube rigidly affixed to a frame of said platform trailer, said upright post provided with a butt end adapted to be removably disposed into said socket tube, said upright post provided with a pulley adjacent an upper end thereof, wherein said pulley at said upper end of said post receives a cable therein, said cable extending from a winch of said platform trailer to an attachment point on said tag axle, said device lifting said tag axle free from a traveling surface engaging position, inverting said tag axle about a horizontal pivot disposed at an end of said platform trailer and lowering said tag axle into an inverted stowed position onto said bed of said platform trailer, said device also provided for lifting and deploying said tag axle from said inverted stowed position on said bed of said platform trailer and lowering said tag axle to said traveling surface engaging position to provide additional wheels on said traveling surface in support of additional load placed upon said bed.

10. A device for lifting and deploying a tag axle of a platform trailer comprises an upright post, a socket tube and an outrigger assembly, said socket tube having an open end and a stop end, said stop end of said socket tube disposed into a bed of said platform trailer, said socket tube rigidly affixed to a frame of said platform trailer, said upright post provided with a butt end adapted to be removably disposed into said socket tube, said upright post provided with a pulley adjacent an upper end thereof, said outrigger assembly comprising a sleeve, an arm and a brace, said arm disposed at an angle from said sleeve, said brace extending from said sleeve to said arm, said brace rigidly affixed to said arm and said sleeve, said arm provided with a pulley at a free end of said arm, said sleeve of said outrigger assembly adapted to slide freely over said upper end of said post and be removable therefrom, said sleeve provided with means to temporarily retain said outrigger assembly on said post wherein said pulley at said upper end of said post and said pulley at said free end of said arm receive a cable therein, said cable extending from a winch of said platform trailer to an attachment point on said tag axle, said device lifting said tag axle free from a traveling surface engaging position, inverting said tag axle about a horizontal pivot disposed at an end of said platform trailer and lowering said tag axle into an inverted stowed position onto said bed of said platform trailer, said device also provided for lifting and deploying said tag axle from said inverted stowed position on said bed of said platform trailer and lowering said tag axle to said traveling surface engaging position to provide additional wheels on said traveling surface in support of additional load placed upon said bed.

11. A tool for deploying and re-stowing a tag axle of a trailer comprises an upright post and an arm, said arm affixed to a free end of said vertical post at an angle relative to said vertical post, a butt end of said vertical post removably disposed into a socket tube disposed into a bed of said trailer, said socket tube rigidly affixed to a frame of said trailer, said free end of said vertical post provided with a first pulley disposed therein, said first pulley having a groove circumferentially disposed in an exterior surface thereof, said arm having a free end thereof spaced from said vertical post, said free end provided with a second pulley disposed therein, said second pulley having a groove circumferentially disposed in an exterior surface thereof, said groove of said first pulley and said groove of said second pulley adapted to receive a cable therein wherein a hook attached at a free end of said cable is received in a "D" ring disposed through a rear channel of said tag axle and an opposite end of said cable is affixed to a winch provided onboard of said trailer, said device lifting said tag axle free from a traveling surface engaging position, inverting said tag axle about a horizontal pivot disposed at an end of said platform trailer and lowering said tag axle into an inverted stowed position onto said bed of said platform trailer, said device also provided for lifting and deploying said tag axle from said inverted stowed position on said bed of said platform trailer and lowering said tag axle to said traveling surface engaging position to provide additional wheels on said traveling surface in support of additional load placed upon said bed.

12. A device as in claim 11 wherein said socket has a stop end.

13. A tool as in claim 12 wherein said one end of said vertical post is fitted into said socket against said stop end with said free end of said arm pointing toward a rear of said trailer for deploying said tag axle assembly.

14. A tool as in claim 12 wherein said one end of said vertical post is fitted into said socket against said stop end with said free end of said arm pointing toward a front of said trailer for re-stowing said tag axle assembly.

15. A device as in claim 12 wherein said socket tube is selected from a group of shapes consisting of I, right angle, U, rectangular, circular, triangular, oval or combinations thereof.

16. A device as in claim 11 wherein said upright post is selected from a group of shapes consisting of I-beam, right angle, U-channel and rectangular, circular, triangular and oval box beams or combinations thereof.

17. A device as in claim 11 wherein said arm and said brace of said outrigger assembly are selected from a group of shapes consisting of I-beam, right angle, U-channel and rectangular, circular, triangular and oval box beams or combinations thereof.

18. A device as in claim 11 wherein said angle is between forty-five and one hundred thirty five degrees.

19. A device as in claim 18 wherein said angle is ninety degrees.

* * * * *